United States Patent
Gotwals et al.

(10) Patent No.: US 10,873,522 B2
(45) Date of Patent: *Dec. 22, 2020

(54) TESTING AN UPSTREAM PATH OF A CABLE NETWORK

(71) Applicant: VIAVI SOLUTIONS INC., San Jose, CA (US)

(72) Inventors: Michael D. Gotwals, Greenwood, IN (US); David W. Jones, Pittsboro, IN (US)

(73) Assignee: VIAVI SOLUTIONS INC., San Jose, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 16/107,318

(22) Filed: Aug. 21, 2018

(65) Prior Publication Data

US 2019/0075038 A1    Mar. 7, 2019

Related U.S. Application Data

(63) Continuation of application No. 15/262,875, filed on Sep. 12, 2016, now Pat. No. 10,063,454, which is a
(Continued)

(51) Int. Cl.
*H04L 12/26* (2006.01)
*H04B 17/00* (2015.01)
(Continued)

(52) U.S. Cl.
CPC .............. *H04L 43/50* (2013.01); *H04B 17/00* (2013.01); *H04B 17/309* (2015.01); *H04L 1/24* (2013.01);
(Continued)

(58) Field of Classification Search
None
See application file for complete search history.

(56) References Cited

U.S. PATENT DOCUMENTS

| | | |
|---|---|---|
| 5,790,523 A | 8/1998 | Ritchie et al. |
| 6,370,163 B1 | 4/2002 | Shaffer |

(Continued)

FOREIGN PATENT DOCUMENTS

WO    WO-0013424    3/2000

OTHER PUBLICATIONS

Jim Walsh, "PathTrak QAMTrak Analyzer Functionality", Mar. 16, 2009, pp. 1-13.
(Continued)

*Primary Examiner* — Steve R Young
(74) *Attorney, Agent, or Firm* — Mannava & Kang, P.C.

(57) ABSTRACT

An apparatus and method for testing an upstream path of a cable network are disclosed. The upstream path is tested by capturing and analyzing upstream data packets generated by a specific terminal device. A test instrument is connected at a node of the cable network. The test instrument establishes a communication session with the headend, informing the headend of an identifier of the device that will generate the test upstream data packet. The test upstream data packet is captured and analyzed at the headend, so that the results of the analysis can be communicated back to the test instrument. To speed up the packet capturing and filtering process, the upstream data packets can be pre-filtered based on packet duration and/or arrival time.

13 Claims, 6 Drawing Sheets

Related U.S. Application Data continuation of application No. 13/174,272, filed on Jun. 30, 2011, now Pat. No. 9,450,686.

(51) Int. Cl.

| | | |
|---|---|---|
| *H04L 1/24* | (2006.01) | |
| *H04B 17/309* | (2015.01) | |
| *H04L 29/12* | (2006.01) | |
| *H04L 25/03* | (2006.01) | |
| *H04L 27/36* | (2006.01) | |

(52) U.S. Cl.
CPC .......... *H04L 43/026* (2013.01); *H04L 43/028* (2013.01); *H04L 43/045* (2013.01); *H04L 61/6022* (2013.01); *H04L 25/03343* (2013.01); *H04L 27/366* (2013.01)

(56) References Cited

U.S. PATENT DOCUMENTS

| | | | |
|---|---|---|---|
| 6,414,942 B1 | 7/2002 | Ito | |
| 6,425,132 B1 | 7/2002 | Chappell | |
| 6,515,967 B1 | 2/2003 | Wei | |
| 6,650,698 B1 | 11/2003 | Liau et al. | |
| 6,791,995 B1 | 9/2004 | Azenkot et al. | |
| 7,010,730 B1 | 3/2006 | Jaworski et al. | |
| 7,061,973 B1 | 6/2006 | Mehrabanzad et al. | |
| 7,333,558 B2 * | 2/2008 | Nemer ............... | H04L 25/03343 375/296 |
| 7,362,800 B1 * | 4/2008 | Zerbe ................ | H04B 17/0085 375/226 |
| 7,403,486 B2 | 7/2008 | Flask | |
| 7,451,472 B2 | 11/2008 | Williams | |
| 7,489,641 B2 | 2/2009 | Miller et al. | |
| 7,715,437 B2 | 5/2010 | Denney et al. | |
| 7,792,183 B2 | 9/2010 | Massey | |
| 7,796,526 B2 | 9/2010 | Miller | |
| 7,873,322 B2 | 1/2011 | Flask et al. | |
| 7,885,195 B2 | 2/2011 | Volpe et al. | |
| 9,036,751 B1 * | 5/2015 | Wang ................... | H04L 5/0053 375/350 |
| 9,900,406 B1 * | 2/2018 | Hanks ................. | H04L 5/0085 |
| 10,747,688 B2 * | 8/2020 | Jen ...................... | G06F 13/4282 |
| 2002/0019983 A1 | 2/2002 | Emsley et al. | |
| 2002/0136165 A1 | 9/2002 | Ady et al. | |
| 2002/0159537 A1 | 10/2002 | Crilly | |
| 2003/0126255 A1 | 7/2003 | Rice et al. | |
| 2004/0073937 A1 | 4/2004 | Williams | |
| 2004/0088733 A1 | 5/2004 | Havens et al. | |
| 2004/0234016 A1 * | 11/2004 | Leblond .................. | G01S 19/23 375/350 |
| 2004/0244043 A1 | 12/2004 | Lind et al. | |
| 2005/0047442 A1 | 3/2005 | Volpe et al. | |
| 2005/0144648 A1 | 6/2005 | Gotwals et al. | |
| 2006/0007999 A1 * | 1/2006 | Gomez .................... | H04B 1/30 375/235 |
| 2006/0126515 A1 | 6/2006 | Ward | |
| 2007/0036176 A1 | 2/2007 | Quingley | |
| 2007/0121712 A1 * | 5/2007 | Okamoto ................. | H04L 1/24 375/222 |
| 2007/0133425 A1 | 6/2007 | Chappell | |
| 2008/0291840 A1 | 11/2008 | Cooper et al. | |
| 2008/0291990 A1 | 11/2008 | Yoshida | |
| 2008/0298270 A1 | 12/2008 | Chappell et al. | |
| 2009/0213737 A1 | 8/2009 | Potter | |
| 2009/0268034 A1 | 10/2009 | Nowotarski et al. | |
| 2009/0271836 A1 | 10/2009 | Maxson et al. | |
| 2010/0080133 A1 | 4/2010 | Oron | |
| 2010/0157824 A1 | 6/2010 | Thompson et al. | |
| 2010/0158093 A1 | 6/2010 | Thompson et al. | |
| 2010/0309805 A1 | 12/2010 | Jones et al. | |
| 2010/0322299 A1 * | 12/2010 | Draving ............. | H04L 25/0305 375/232 |
| 2011/0069745 A1 | 3/2011 | Thompson | |
| 2011/0137991 A1 * | 6/2011 | Russell ................. | G06Q 10/06 709/204 |
| 2012/0230385 A1 * | 9/2012 | Currivan ................ | H04L 25/022 375/233 |
| 2014/0143626 A1 | 5/2014 | Mull | |

OTHER PUBLICATIONS

JDS Uniphase Corporation, "PathTrak WebView Software", Jul. 2009, 4 pages.

* cited by examiner

TESTING AN UPSTREAM PATH OF A CABLE NETWORK

PRIORITY

This application is a Continuation of commonly assigned and U.S. patent application Ser. No. 15/262,875, filed Sep. 12, 2016, now U.S. Pat. No. 10,063,454, issued Aug. 28, 2018, which is a Continuation of U.S. patent application Ser. No. 13/174,272, filed Jun. 30, 2011, now U.S. Pat. No. 9,450,686, issued Sep. 20, 2016.

TECHNICAL FIELD

The present invention relates to network testing, and in particular to testing of an upstream signal path of a cable network.

BACKGROUND OF THE INVENTION

Cable networks have, in recent years, moved beyond merely broadcasting television signals over a co-ax cable to subscribers in their homes. Subscribers of a cable network nowadays have a modem allowing the transmission of digital signals upstream toward the headend of the network. Among many services afforded by cable modems are: an Internet service, a home shopping service using a television catalogue, and a voice-over-IP phone service.

In bidirectional cable networks, the upstream and the downstream signals occupy separate frequency bands called upstream and downstream spectral bands. In the United States, the upstream spectral band typically spans from 5 MHz to 42 MHz, while the downstream spectral band typically spans from 50 MHz to 860 MHz. Downstream information channel signals co-propagate in the downstream spectral band, and upstream signals co-propagate in the upstream spectral band. The frequency separation of the upstream and the downstream signals allows bidirectional amplification of these signals propagating in a common cable in opposite directions.

To provide upstream communication capability to a multitude of subscribers, the upstream frequency channels are used in a so called time-division multiplexing (TDM) mode. Each cable modem is assigned a time slot, within which it is allowed to transmit information. The time slots are assigned dynamically by a cable modem termination system (CMTS) disposed at the headend. The time slot information is communicated by CMTS to individual cable modems via an allocated downstream channel. Subscribers access available network resources by using a data communication bridge established between CMTS and individual cable modems. Subscribers send data from their digital devices into cable modems, which then relay the data to the CMTS. The CMTS, in turn, relays the information to appropriate services such as Internet servers, for example. Information destined to the subscriber digital device is provided from the Internet servers to the CMTS, which in turn relays the information to individual cable modems. The cable modems then relay the information to the digital devices used by the subscribers.

One popular communication standard for bidirectional data transport over a cable network is the Data Over Cable Service Interface Specification (DOCSIS). DOCSIS establishes rules of communication between CMTS and cable modems in a cable network. Three revisions currently exist for a North American DOCSIS standard, DOCSIS 1.x, 2.0, and 3.0. In addition to the 6-MHz wide North American based DOCSIS standard, there exists a European (Euro-DOCSIS) standard formatted for 8-MHz wide bandwidth channels.

As cable communication systems grow and become more complex, the task of proper system maintenance and troubleshooting becomes more difficult. The difficulty results from a random nature of signal bursts from individual cable modems. Although the cable modems are allocated time slots in which they are allowed to transmit, the actual transmission depends on network activity of individual subscribers. Furthermore, the upstream signal bursts from the cable modems have a very short duration and arrive intermittently from a multitude of locations in the cable network. Consequently, an upstream signal from a faulty location is interspersed with upstream signals from locations that are functioning normally. To be able to detect and eliminated faults in a cable network, it is important to identify faulty network locations.

While it is the headend where faulty signals' locations can be detected, it is the remote locations where the faults typically occur. A technician willing to fix a network problem must first analyze the symptoms of the problem at the headend, then determine a geographical location of the fault, then drive there and attempt to fix the problem, then drive back to the headend and make sure the problem is fixed. One can employ two technicians equipped with a mobile communications device allowing them to communicate with each other, one technician remaining at the headend, and the second technician moving around in the field. This solution is costly because it increases labor costs. Furthermore, it is often difficult for the technician located at the headend to verbally describe the signal degradation patterns he observes to the technician located in the field.

The need to test the upstream signal path from a node disposed remotely from a headend is recognized in the art. In U.S. Pat. No. 7,489,641 by Miller et al., upstream path test apparatus and method are described. In the method of Miller et al., test data packets are generated by a test device connected to a remote node. The test data packets have the destination address of the test device itself. Therefore, when the test data packets are transmitted to the headend, the headend automatically routes them back to the test device. The test packets are then received, demodulated, and analyzed by the test device for faults. Disadvantageously, the test apparatus of Miller et al. cannot distinguish whether the degradation has occurred in the upstream path or the downstream path of the network.

In US Patent Application Publication 20050047442, Volpe et al. describes a test system that is configured to receive all upstream/downstream channels and demodulate upstream packets. A database of MAC/SID addresses is built, which allows the test system to eventually determine where the packets came from. Once the database is built, the origin of faulty data packets can be determined. Disadvantageously, the test system of Volpe lacks a capability to troubleshoot a particular upstream signal problem in real time.

Test systems for upstream signal analysis are known in the art. By way of example, PathTrak™ and QAMTrack™ test systems, manufactured by JDSU Corporation located in San Jose, Calif., USA, allow for upstream signal demodulation, analysis, and MAC address filtering at the headend. The results of the analysis can be made available for remote clients through a web browser interface. To test a particular node or a cable modem, one can specify a MAC address of a cable modem under test. Provided that enough time is given to the PathTrak system, an upstream signal burst from the cable modem under test can be captured at the headend and subsequently analyzed for faults. Unfortunately, due to random nature of upstream signal bursts, and due to long time required for packets demodulating and MAC filtering, analysis of faults at a particular node cannot always be performed in an efficient way. Furthermore, even when the data packet is correctly identified, the PathTrak system does not have an access to pre-equalization coefficients used by the cable modem under test to generate the upstream burst. Without the pre-equalization coefficients, the test system cannot determine correctly the upstream path signal distortions and the in-band spectral response.

The prior art is lacking a test method and a system allowing a technician to analyze and troubleshoot upstream path problems by performing a real-time analysis of test data packets generated by a specific device in the field and received at the headend of a cable network. The present invention provides such a device and a method.

SUMMARY OF THE INVENTION

A test system of the present invention performs capture and analysis of upstream data packets generated by a specific terminal device of the cable network in process of a normal operation of the terminal device. The terminal device is specified by a technician using a test instrument connected to a node of the cable network. A test module, located at the headend, performs the necessary analysis of the upstream data packet generated by the specified terminal device, and reports the results to the test instrument. The test instrument itself can send upstream test data packets to test the upstream path between the node and the headend. In one embodiment, the technician can request a particular terminal device to send, on a command from the test instrument relayed at the headend to the terminal device, an upstream test packet of a pre-determined length. In another embodiment, the test module is capable to pre-filter upstream data packets based on the packet length, to speed up upstream packet processing and analysis.

Besides packet length, the pre-filtering can also be based on the packet repetition rate: only data packets of a pre-defined length or repetition rate, or both, are selected for demodulation. The selected upstream data packets are demodulated, and the origin of the data packets is determined by locating an identifier of a source of the data packet. For example, media access control (MAC) addresses can be used to determine the packet origin. At least one quadrature amplitude modulation (QAM) quality parameter, such as modulation error ratio (MER), is collected, together with other upstream path quality parameters such as spectral response, ingress noise, etc. In one embodiment, pre-equalization information of the upstream data packets can be taken into account mathematically when calculating a spectral response of the upstream path traveled by the demodulated upstream data packets with matching MAC addresses.

In accordance with the invention there is provided a method of testing an upstream path of a cable network including a headend and a node connected to the headend, the method comprising:

(a) sending from a test instrument operably connected to the node a request to the headend to demodulate and obtain signal quality information of an upstream data packet generated by a first terminal device connected to the cable network;

(b) receiving the test request at the headend;

(c) receiving and demodulating at the headend the upstream data packet generated by the first terminal device;

(d) obtaining, at the headend, at least one pre-equalization coefficient used by the first terminal device to generate the upstream data packet;

(e) obtaining, at the headend, the signal quality information of the upstream data packet demodulated in step (c), wherein the signal quality information is corrected for pre-equalization using the at least one pre-equalization coefficient obtained in step (d).

In accordance with another aspect of the invention there is provided a method of testing an upstream path of a cable network including a headend and a node connected to the headend, the method comprising:

(a) sending from a test instrument operably connected to the node a request to the headend to demodulate and obtain signal quality information of an upstream data packet generated by a first terminal device connected to the cable network;

(b) receiving the test request at the headend;

(c) receiving and demodulating at the headend the upstream data packet generated by the first terminal device;

(d) obtaining, at the headend, the signal quality information of the upstream data packet demodulated in step (c), wherein the upstream data packet has a target packet length, wherein step (c) includes pre-filtering upstream data packets based on packet length, so that only upstream data packets having the target packet length are selected for demodulation.

In accordance with another aspect of the invention there is further provided an apparatus for testing an upstream path of a cable network including a headend and a node connected to the headend, the apparatus comprising:

a test instrument for operably coupling to the node, wherein the test instrument is configured for sending a request to the headend to demodulate and obtain signal quality information of an upstream data packet generated by a first terminal device connected to the cable network, and a test module disposed at the headend, the test module including:

a communication circuit for receiving the test request and the upstream data packet;

a demodulator coupled to the communication circuit, for demodulating the upstream data packet generated by the first terminal device; and a processor coupled to the demodulator and the communication circuit, for obtaining the signal quality information of the demodulated upstream data packet, wherein the signal quality information is corrected for pre-equalization using at least one pre-equalization coefficient used by the first terminal device to generate the upstream data packet.

In one embodiment, the communication circuit is configured for communicating thus obtained signal quality information back to the test instrument. The test instrument preferably has a display for displaying the obtained signal quality information.

In accordance with another aspect of the invention, there is further provided an apparatus for testing an upstream path of a cable network including a headend and a node connected to the headend, the apparatus comprising:

a test instrument for operably coupling to the node, wherein the test instrument is configured for sending a request to the headend to demodulate and obtain signal quality information of an upstream data packet generated by a first terminal device connected to the cable network, and a test module disposed at the headend, the test module including:

a communication circuit for receiving the test request and the upstream data packet;

a demodulator coupled to the communication circuit, for demodulating the upstream data packet generated by the first terminal device; and a processor coupled to the demodulator and the communication circuit, for obtaining the signal quality information of the demodulated upstream data packet.

In the latter embodiment, the test instrument is configured to generate upstream data packets of a fixed length, and the test module is configured to pre-filter upstream data packets based on packet length, thus considerably reducing time of identifying the upstream data packet generated by the first terminal device.

In accordance with another aspect of the invention there is further provided a cable network comprising the above test apparatus, the headend, the node connected to the headend, and a plurality of terminal devices connected to the node, the plurality of terminal devices including a first terminal device, wherein the first terminal device is configured for generation of an upstream test data packet of a first length selectable by the test module;

wherein the test module is configured to send, upon receiving a command form the test instrument, a request to the first terminal device to generate the upstream test data packet of the first length; and wherein the test module is configured to pre-filter upstream data packets based on packet length, for identifying the upstream test data packet of the first length.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1:
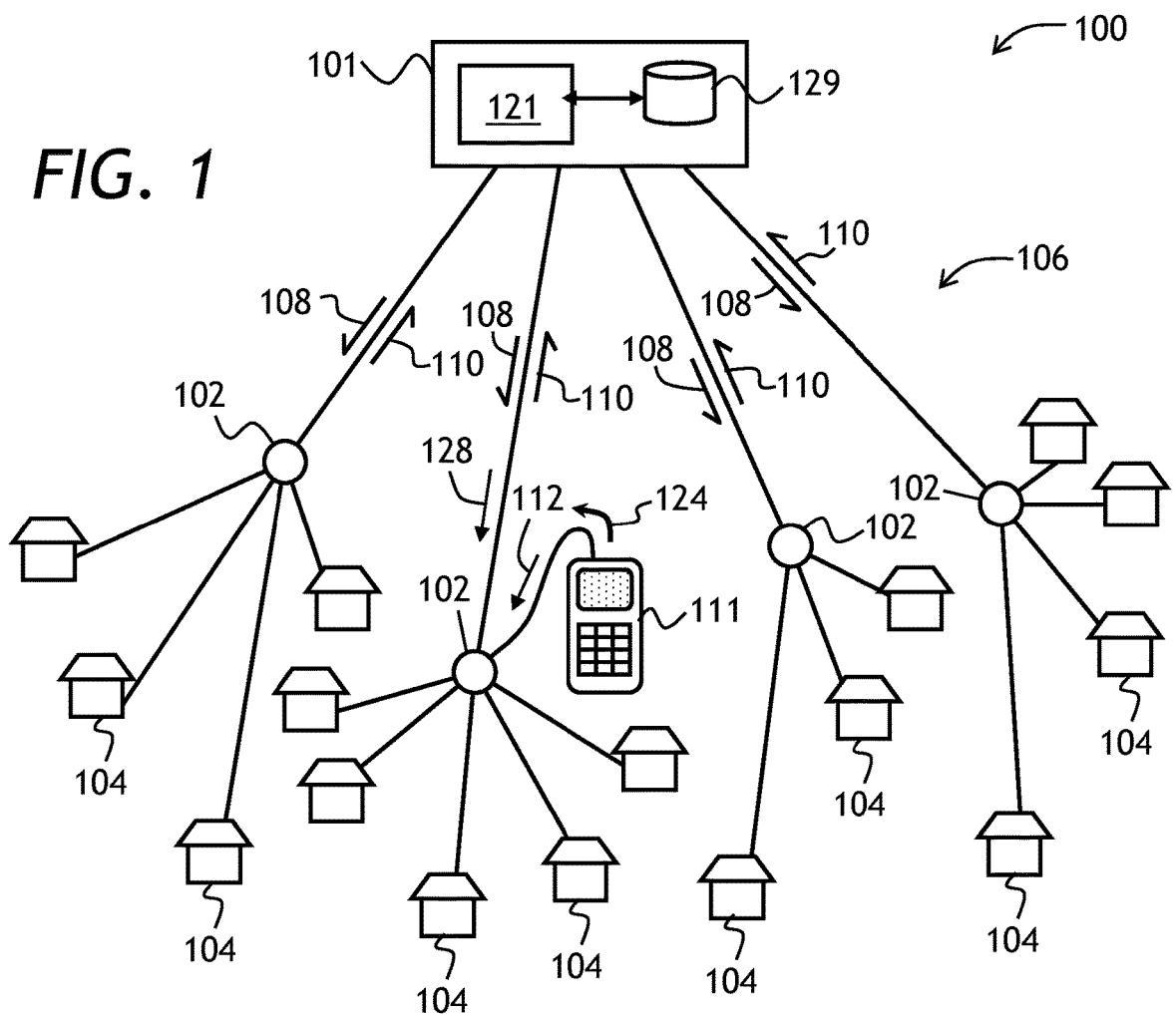
FIG. 1 is s diagram of a cable network, showing a test instrument of the invention coupled to a node of the network.

Referring to FIG. 1, a cable network 100 includes a headend 101, a plurality of nodes 102, and a plurality of terminal devices 104. A cable plant 106 connects the terminal devices 104 to the respective nodes 102, and the nodes 102 to the headend 101. The terminal devices 104 can include digital TV boxes, VoIP phone systems, and cable modems. In operation, the headend sends downstream signals 108 to the terminal devices 104 through the cable plant 106. The downstream signals 110 include TV broadcasting signals, as well as DOCSIS downstream data packets and control signals. The terminal devices 104 send upstream signals 110, for example DOCSIS upstream data bursts.

A test instrument 111 is operably coupled to one of the nodes 102. The test instrument 111 is configured to send a test request 112 to the headend 101 to demodulate and obtain signal quality information of an upstream data packet 124 generated by a certain device connected to the cable network 100. This device can be one of the terminal devices 104, or the test instrument 111 itself. The device selected for testing is preferably identified by its media access control (MAC) address. The MAC address is selectable by an operator of the test instrument 111. In the embodiment shown in FIG. 1, it is the test instrument 111 that sends the upstream data packet 124, and, accordingly, the MAC address is that of the test instrument 111 itself. The test request 112 is received by a test module 121 located at the headend 101.

Figure 2:
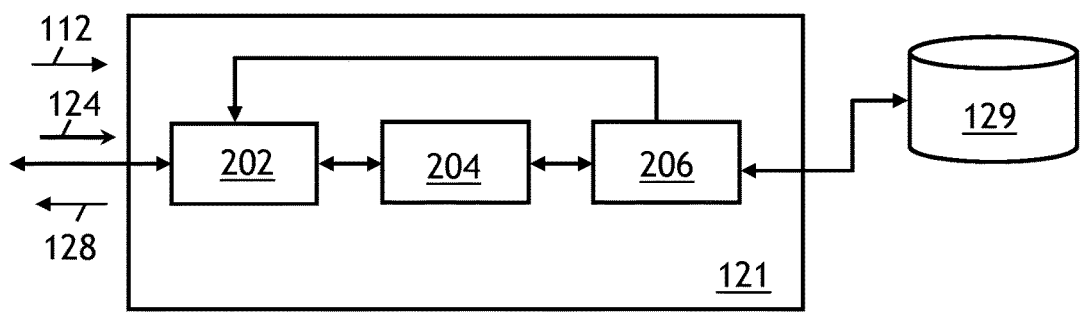
FIG. 2 is a block diagram of a test module located at the headend of the cable network of FIG. 1.

Referring to FIG. 2, the test module 121 includes a communication circuit 202 for receiving the test request 112 and the upstream data packet 124, a demodulator 204 coupled to the communication circuit 202, for demodulating the upstream data packet 124, and a processor 206 coupled to the demodulator 204 and to the communication circuit 202, for calculating signal quality parameters of the demodulated upstream data packet and for sending, through the communication circuit 202, signal quality information 128 back to the test instrument 111.

Herein, the term "signal quality information" means a quadrature amplitude modulation (QAM) quality parameter or information related to quality of an upstream signal. The signal quality information 128 may include, by way of a non-limiting example, modulation error ratio (MER), in-band frequency response, in-band group delay, micro-reflections, impulse noise, a number of captured symbols in the upstream data packet, a number of erroneously detected symbols in the upstream data packet, a constellation map, and an RF power level. The measured frequency response may be corrected for pre-equalization used by the selected terminal device to transmit the upstream data packet 124. Advantageously, combining QAM quality information with the frequency response corrected for pre-equalization provides an operator of the test instrument 111 with a broad, multi-level set of data sufficient for troubleshooting most upstream path problems.

According to one embodiment of the invention, the pre-equalization coefficients are stored in a database 129 located at the headend 101. The database 129 associates the terminal devices 104 connected to the cable network 100 with pre-equalization coefficients that have been sent by the cable modem termination system (CMTS) of the headend 101 to the terminal devices 104 for use in generation of the upstream transmission signals 110. Upstream signal pre-equalization is known to a person skilled in the art to be a part of the DOCSIS communication protocol.

Figure 3:
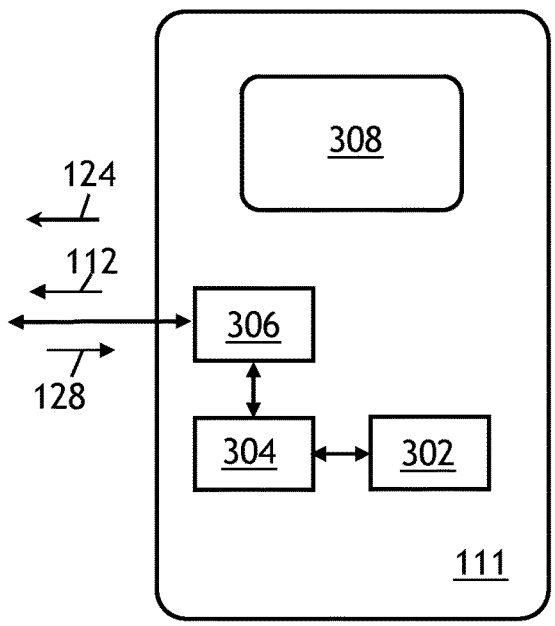
FIG. 3 is a block diagram of the test instrument of FIG. 1.

Referring now to FIG. 3, the test instrument 111 includes a packet generator 302 for generating the upstream data packets 124, a pre-equalization circuit 304 coupled to the packet generator 302, for pre-equalizing the upstream data packets 124, a communication unit 306, coupled to the pre-equalization circuit 304, for communicating pre-equalization coefficients to the test module 121 at the headend 101, and a display 308 for displaying the received pre-equalized signal quality information 128.

A technician wishing to test the upstream path at one of the nodes 102 of the cable network 100, connects the test instrument 111 to the selected node 102 and causes the test instrument 111 to send the test request 112 to the test module 121. The test request 112 contains an identifier, such as a MAC address, of a device that generates the upstream data packet 124 to be captured and demodulated by the test module 121. The technician can select a MAC address of one of the terminal devices 104 of the cable network 100, depending on which of the nodes 102 is being tested. In one embodiment, the terminal devices 104 generate the upstream data packets 124 as a part of their normal operation. In another embodiment, the terminal devices 104 are configured to send a "test" upstream data packet upon receiving a request from the headend 101. The headend 101 generates this request in response to a command from the test instrument 111. Alternatively or in addition, the technician can select the test instrument 111 itself to be the source of the test upstream data packets. In this case, the upstream data packet 124 will be automatically generated by the test instrument 111 shortly after issuing the test request 112.

The test request 112 is received by the test module 121. Upon receiving the test request 112, the test module 121 starts capturing and demodulating upstream data packets. Demodulated packets are screened for a device identifier contained in the test request 112. Upon finding the packet with a matching device identifier, the processor 206 calculates the signal quality information 128, which can be corrected mathematically for pre-equalization used in the transmission of the upstream data packet 124. This is more beneficial than sending the upstream data packet 124 not pre-equalized, because the un-equalized upstream data packet 124 may arrive too distorted for the demodulation to work, in which case no QAM quality information could be measured at all. As noted above, the pre-equalization coefficients can be obtained from the database 129. In the embodiment where the test instrument itself generates the upstream data packet, the pre-equalization coefficients can be supplied by the test instrument 111. For example, the pre-equalization coefficients can be included in the payload of the upstream data packet 124. After demodulation of the upstream data packet 124, these coefficients will be obtained by the processor 206, which can use them to correct the signal quality information 128 for pre-equalization.

In one embodiment, the obtained signal quality information 128 is communicated to the test instrument 111. The technician observes the test results on the display 308 of the test instrument 111. Advantageously, this provides a real-time feedback for the technician performing repairs in the field. In another embodiment, the test module 121 keeps performing tests and accumulating results at the headend, to be observed by the technician at a later time at the headend or elsewhere in the field, using a Web browser interface connected to the Internet.

Figure 4:
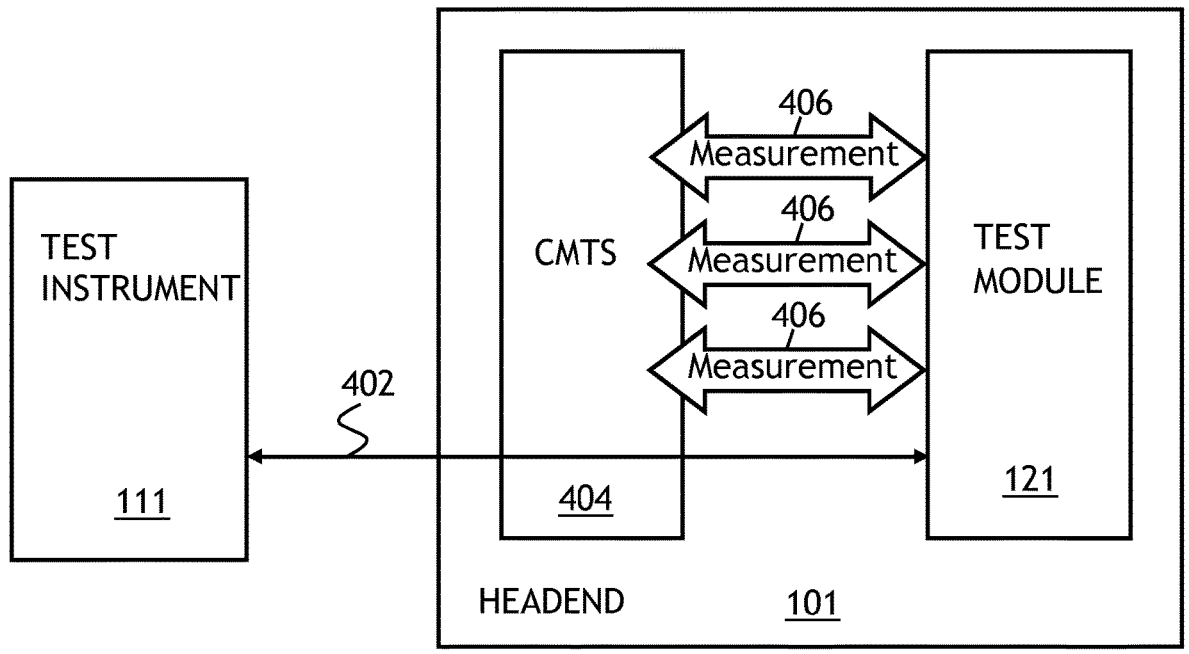
FIG. 4 is a block diagram showing a connection between the test instrument, the test module of FIG. 2, and a cable modem termination system (CMTS) of the cable network of FIG. 1.

Referring now to FIG. 4, the test instrument 111 establishes a line of communication 402 with the test module 121. The test module 121 performs measurements 406 of various signals in a CMTS 404, to obtain the signal quality data. The line of communication 402 can be formed based on a service DOCSIS channel, an out-of-band (OOB) service channel, or, if time permits to make such a connection, a separate regular DOCSIS bidirectional communications channel.

Figure 5:
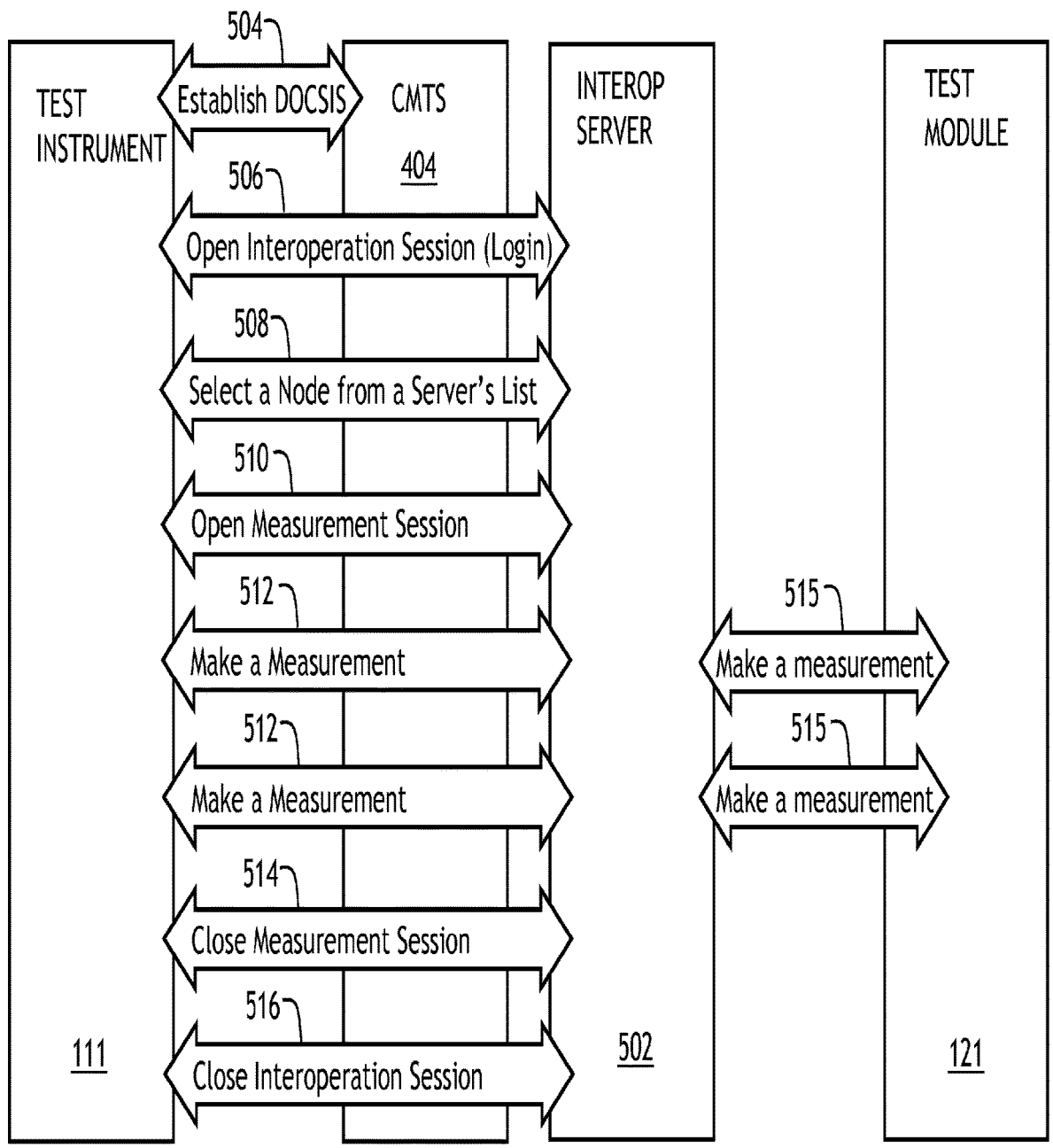
FIG. 5 is a block diagram of a test system for testing the upstream path according to an embodiment of the invention, showing flow of commands between modules of the system.

In FIG. 5, the above mentioned embodiment, in which the line of communication 402 is formed using a regular DOCSIS bidirectional communications channel, is illustrated in more detail. To perform signal quality measurements, the test instrument 111 first establishes a regular DOCSIS communication channel with the CMTS 404, as indicated by "Establish DOCSIS" command 504. Then, the test instrument 111 opens a TCP/IP communications session with an interoperations server 502, as indicated by "Open Interoperation Session" command 506. The interoperations server 502 is a Web based application that uses a standard Web browser to communicate with the test instrument 111. The interoperations server 502 provides the test instrument 111 with a list of currently active nodes 102 of the cable network 100. The user of the test instrument 111 selects a node from the list, as shown at 508, and a measurement session 510 is opened. At this point, the user can use the test instrument 111 to send specific commands 512 to the test module 121 to make measurements 515. Once all of the measurements 515 are performed, the user closes the measurement session, as indicated at 514. Then, in response to a "Close Interoperation Session" command 516, the interoperation session is closed.

Figure 6:
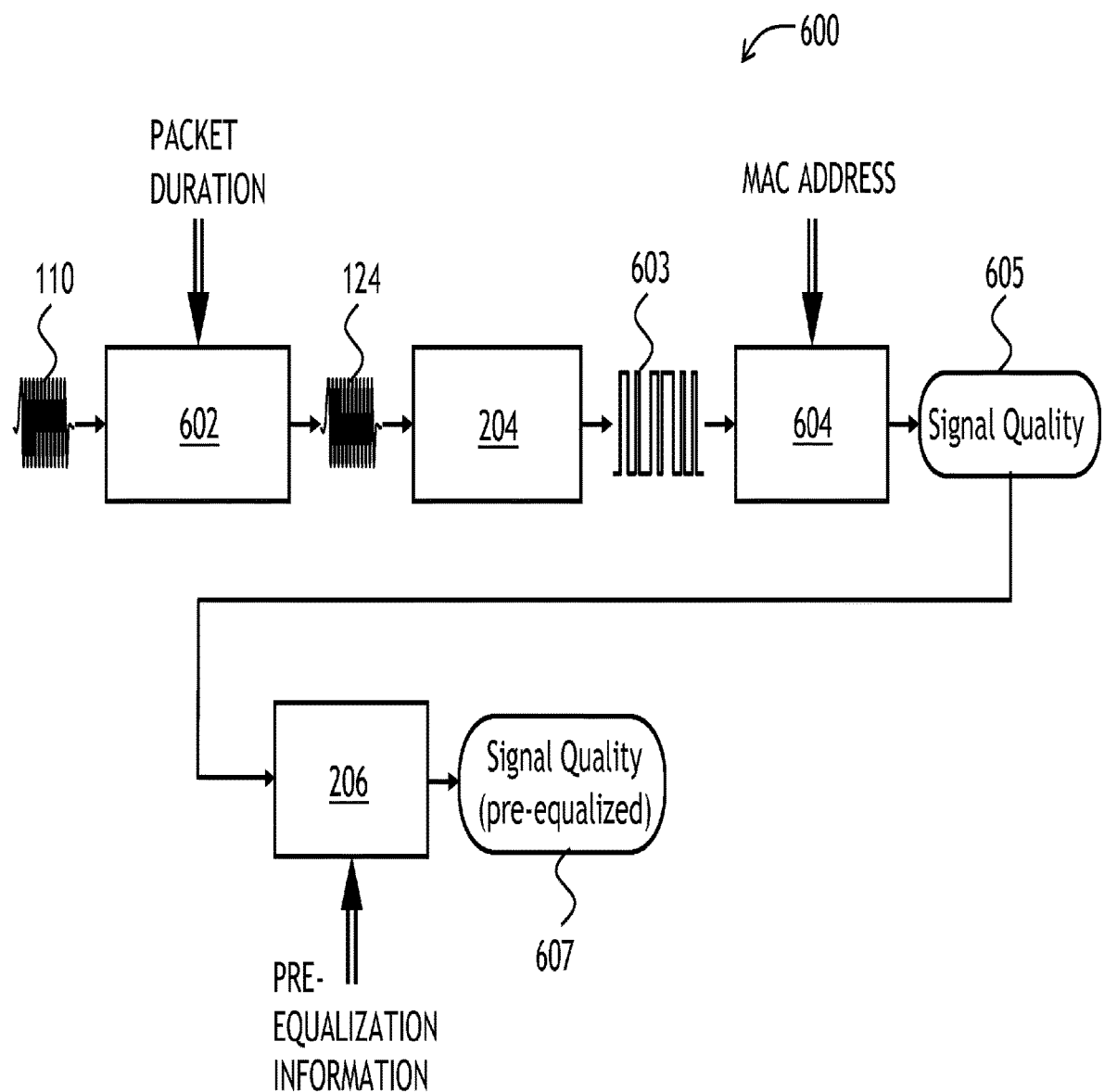
FIG. 6 is a block diagram of upstream packet pre-filtering apparatus according to an embodiment of the invention.

According to one embodiment of the invention, pre-filtering of upstream data packets at the headend is used to improve speed and reliability of detecting and processing the upstream data packets 124 sent by the test instrument 111. Referring now to FIG. 6, a pre-filtering apparatus 600 is a part of the test module 121. The pre-filtering apparatus 600 includes a packet duration filter 602, the demodulator 204, a MAC filter 604, and the processor 206. In operation, the packet duration filter 602 filters the upstream traffic 110, passing through packets having a duration of the upstream packet 124. The upstream packet 124 generated by the test instrument 111 passes through the packet duration filter 602 and is demodulated by the demodulator 204. The packet in digital form 603 is filtered by the MAC address at the MAC filter 604. Signal quality information 605 of the demodulated filtered packet 603 is received by the processor 206, which calculates pre-equalized signal quality information 607 based on at least one pre-equalization coefficient used by the test instrument 111 to generate the upstream data packet 124.

Packet length pre-filtering can result in a dramatic improvement of the filtering speed. For example, at an upstream packet rate of 1000 data packets per second, plus 50 packets per second generated by the test instrument 111, and at 100 millisecond demodulation time by the demodulator 204 of the test module 121, the test module 121 will miss 99% of data packets, so that only one test data packet 124 from the test instrument 111 will be detected every two seconds. When the packet length pre-filtering is implemented with 99% efficiency, approximately only 10 packets out of the 1000 unwanted packets will be demodulated, which results in 60 packets per second traffic arriving at the input of the demodulator 204. Out of these 60 packets, 10 will be demodulated every second, five of six of these being the upstream data packets 124 generated by the test instrument 111. Therefore, out of the 10 demodulated packets per second, on average, approximately 8 will be the upstream data packets 124 generated by the test instrument 111. Therefore, 8 testing-useful packets will be detected every second, which is 16 times improvement of the testing speed.

Figure 7:
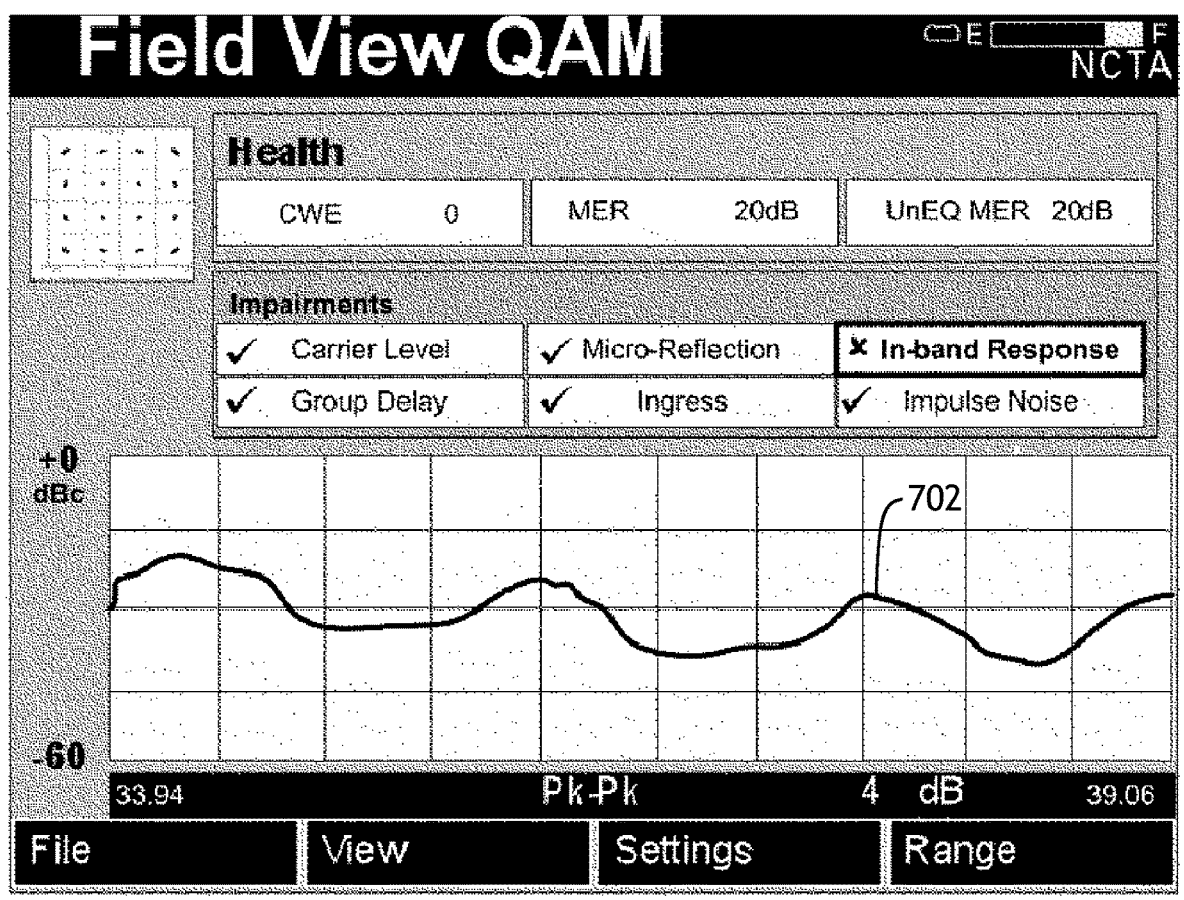
FIG. 7 is an example view of a display of the test instrument, showing signal quality information.

Turning now to FIG. 7, an example view 700 of the display 308 of the test instrument 111 is presented. In FIG. 7, the MER and the pre-equalized MER ("UnEQ MER") are equal to each other and are equal to 20 dB. The in-band response shows a spectral ripple 702.

Figure 8:
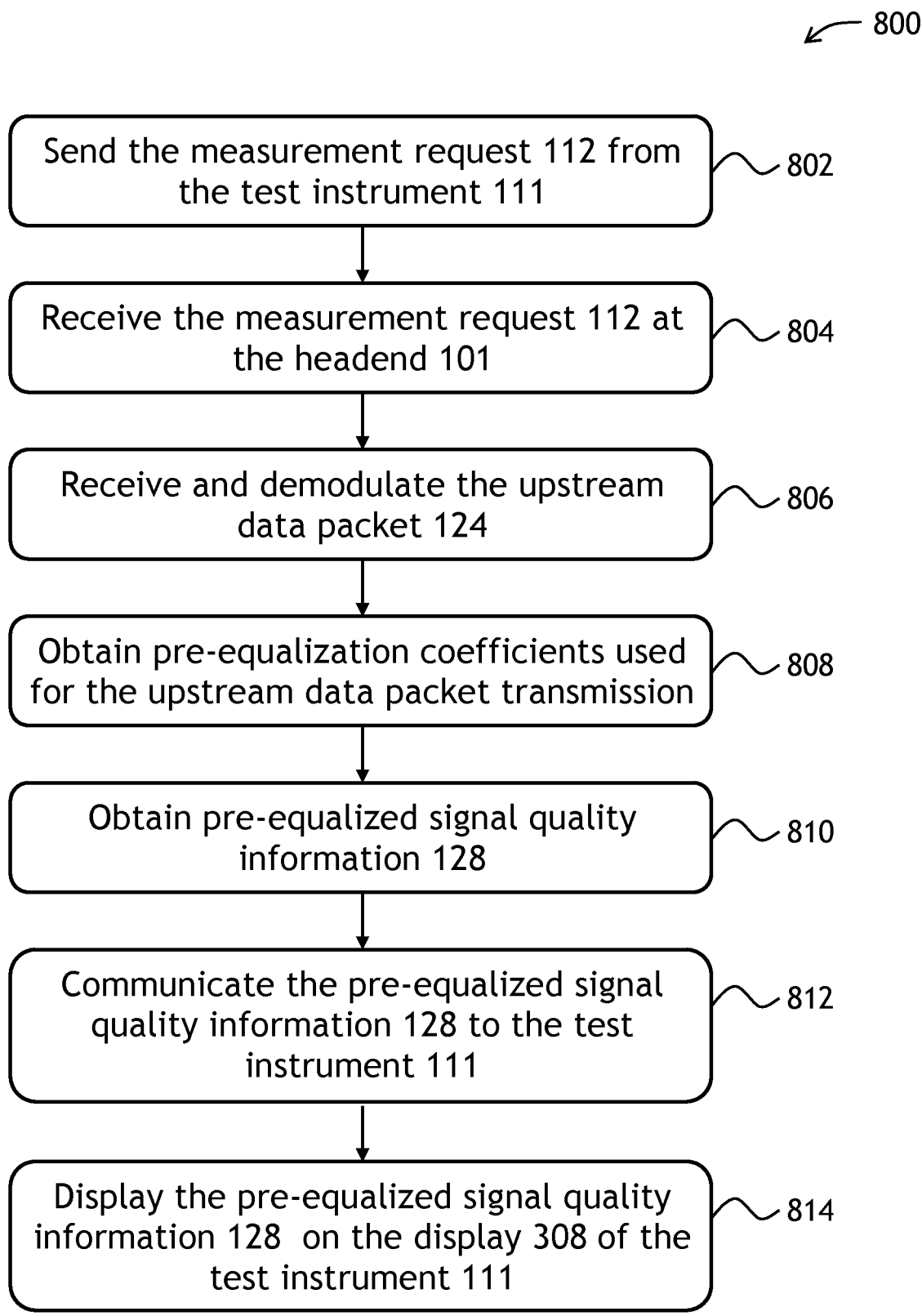
FIG. 8 is a block diagram of method of obtaining the signal quality information according to an embodiment of the invention.

Referring to FIG. 8, a method of testing the upstream path 110 of the cable network 100 is presented. At a step 802, the request 112 is sent from the test instrument 111 to the test module 121 of the headend 101 to demodulate and obtain signal quality information of the upstream data packet 124 generated by the test instrument 111. As noted above, any one of the terminal devices 104 can also be selected at this step. The device to receiving the packet 124 from is identified by a device identifier selectable by the test instrument.

At a step 804, the test request 112 is received by the test module 121. At a step 806, the upstream data packet 124 generated by the test instrument 111 or one of the terminal devices 104, as the case may be, is received and demodulated by the test module 121. At a step 808, at least one pre-equalization coefficient used to transmit the upstream data packet 124 is obtained. At a step 810, the signal quality information of the upstream data packet is obtained. At this step, the signal quality information can be corrected for pre-equalization using the at least one pre-equalization coefficient obtained in the step 808. At an optional step 812, the pre-equalization corrected quality information 128 is communicated to the test instrument 111. Finally, at an optional step 814 in FIG. 8, the obtained signal quality information is displayed on the display 308 of the test instrument 111.

In one embodiment, in the step 808, the at least one pre-equalization coefficient is obtained from the terminal devices database 129. In an embodiment where it is the test instrument 111 that generates the upstream data packet 124, the at least one pre-equalization coefficient is communicated by the test instrument 111 to the test module 121. Preferably, the upstream data packet 124 includes the at least one pre-equalization coefficient digitally encoded therein, so that once the packet 124 is received and demodulated, the pre-equalization information is immediately available to the test module 121 for mathematical correction of the measured in-band spectral response.

Once the upstream data packet 124 is demodulated by the test module 121, QAM quality information can be included in the signal quality information 128. The signal quality information 128 may be communicated to the test instrument 111 in a variety of ways, for example by using a dedicated DOCSIS downstream channel, or by using a DOCSIS service channel. The step 806 of receiving and demodulating the upstream data packet 124 preferably includes a step of pre-filtering upstream data packets based on the packet length, as explained above, so that only upstream data packets having the target packet length are selected for the time-consuming step of demodulation. In one embodiment, the target packet length is selected by obtaining a probability distribution of upstream packet lengths in the cable network, and selecting a packet length having a probability of no more than a certain value, preferably 25%, of a maximum probability of the probability distribution, as the target packet length. The target packet length has to be selected out of the set of lengths allowed by the CMTS 404 according to DOCSIS communications protocol.

In one embodiment, the test instrument is configured for generating the upstream data packets 124 of a target packet length periodically, that is, at regular time intervals. The upstream traffic 110 is filtered based on arrival time of the upstream data packets of the target packet length, thereby identifying the upstream data packets generated by the test instrument at the regular time intervals.

Advantageously, the functionality of upstream packet pre-filtering based on the arrival time or frequency of the upstream data packets 124 generated by the test instruments 111 can be used to automatically discover and register the test instrument 111 at the headend 101 of the cable network 100. The test instrument 111 sends a command to the test module 121 to pre-filter upstream data packets based on the packet length and arrival time (or frequency). This pre-filtering is performed before demodulation and thus can be done quickly and efficiently. The pre-filtered upstream data packets 124 are analyzed for a device ID. If all of them have the same device ID, it is taken to be the ID of the test instrument.

What is claimed is:

1. A system for testing an upstream path of a cable network, the system comprising a terminal device connected to a node associated with the upstream path of the cable network, the terminal device comprising:
   a packet generator to generate test data packets of a target packet length;
   a pre-equalization circuit coupled to the packet generator to pre-equalize the test data packets using pre-equalization coefficients;
   a communication circuit to:
      transmit a test request message to a headend of the cable network to obtain pre-equalized signal quality information of the upstream path of the cable network,
      transmit the pre-equalization coefficients and the test data packets at a regular time interval to the headend of the cable network, and
      receive the pre-equalized signal quality information from the headend, wherein the pre-equalized signal quality information includes a frequency response based on the test data packets; and
   a display to display the pre-equalized signal quality information.

2. The system of claim 1, wherein the target packet length is generated according to:
   a probability distribution of upstream packet lengths in the cable network, wherein the target packet length has a probability of no more than 25% of a maximum probability of the probability distribution of upstream packet lengths.

3. The system of claim 1, further comprising:
   test logic disposed at the headend, the test logic including:
      a second communication circuit for receiving the test data packets via the upstream path of the cable network;
      a packet duration filter to identify the test data packets arriving at the regular time interval and having the target packet length; and
      a processor to:
         determine the pre-equalized signal quality information for the upstream path of the cable network, wherein the pre-equalized signal quality information includes a measured in-band frequency response; and
         correct the measured in-band frequency response to account for pre-equalization of the test data packets.

4. The system of claim 1, wherein the test request message includes a terminal device identifier.

5. The system of claim 1, wherein the terminal device communicates with the headend via a dedicated Data Over Cable Service Interface Specification (DOCSIS) connection.

6. The system of claim 1, further comprising an interoperations server in communication with the headend, the interoperations server providing a list of currently active nodes of the cable network.

7. An apparatus for testing an upstream path of a cable network, the apparatus comprising:
   a packet generator to generate, at a regular time interval, an upstream data packet of a packet length no more than a predetermined value based on a probability distribution of upstream packet lengths in the cable network;
a pre-equalization circuit coupled to the packet generator to pre-equalize the upstream data packet using pre-equalization coefficients;
a communication circuit to:
    transmit a test request message to a headend of the cable network, the test request message including an identifier of a connected device;
    transmit the pre-equalization coefficients and the pre-equalized upstream data packet to the headend; and
    receive, from the headend, pre-equalized signal quality information of the upstream path of the cable network based on the pre-equalized upstream data packet; and
a display to display the pre-equalized signal quality information.

8. The apparatus of claim 7, wherein the packet length has a probability of no more than 25% of a maximum probability of the probability distribution.

9. The apparatus of claim 7, wherein the communication circuit is to form a line of communication with the headend, wherein the line of communication is formed using a DOCSIS bidirectional communications channel.

10. The apparatus of claim 9, in communication with an interoperations server to provide a list of currently active nodes of the cable network, a user of the apparatus to select a node from the list.

11. A method of testing an upstream path of a cable network, the method comprising:
    generating, by a packet generator at a regular time interval, a test packet, the test packet having a packet length no more than a predetermined value based on a probability distribution of upstream packet lengths in the cable network;
    pre-equalizing, by a pre-equalization circuit coupled to the packet generator, the test packet using pre-equalization coefficients;
    communicating, by a communication circuit, the pre-equalization coefficients and the test packet to a headend of the cable network via the upstream path of the cable network; and
    receiving pre-equalized signal quality information from the headend based on the test packet.

12. The method of claim 11, wherein the packet length has a probability of no more than 25% of a maximum probability of the probability distribution.

13. The method of claim 11, wherein communicating of the pre-equalization coefficients and the test packet to a headend of the cable network includes, establishing a DOCSIS bidirectional communications channel with an interoperations server and receiving a list of currently active nodes of the cable network.

* * * * *